(12) United States Patent
Langer et al.

(10) Patent No.: US 8,341,260 B2
(45) Date of Patent: Dec. 25, 2012

(54) METHOD AND SYSTEM FOR IDENTIFICATION OF DECISIVE ACTION STATE OF SERVER COMPONENTS VIA TELEMETRIC CONDITION TRACKING

(75) Inventors: Yuri Langer, Wheaton, IL (US); Aleksey M. Urmanov, San Diego, CA (US); Kenneth C. Gross, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 1222 days.

(21) Appl. No.: 11/505,709

(22) Filed: Aug. 16, 2006

(65) Prior Publication Data
US 2008/0046559 A1  Feb. 21, 2008

(51) Int. Cl.
*G06F 15/173* (2006.01)
(52) U.S. Cl. ......................... 709/224; 709/223
(58) Field of Classification Search .................. 709/224, 709/201; 714/37
See application file for complete search history.

(56) References Cited

U.S. PATENT DOCUMENTS

| | | | |
|---|---|---|---|
| 5,764,509 A | 6/1998 | Gross et al. | |
| 6,327,677 B1 * | 12/2001 | Garg et al. | 714/37 |
| 6,747,878 B1 * | 6/2004 | Johnston, Jr. et al. | 361/801 |
| 6,876,988 B2 * | 4/2005 | Helsper et al. | 706/21 |
| 7,076,400 B2 * | 7/2006 | Dulberg et al. | 702/184 |
| 2002/0178207 A1 | 11/2002 | McNeil | |
| 2002/0183971 A1 | 12/2002 | Wegerich et al. | |
| 2003/0167353 A1 * | 9/2003 | de Bonet et al. | 709/318 |
| 2004/0039801 A9 * | 2/2004 | Srinivasan et al. | 709/221 |
| 2005/0015665 A1 * | 1/2005 | Kato et al. | 714/15 |
| 2005/0149570 A1 * | 7/2005 | Sasaki et al. | 707/104.1 |
| 2005/0161007 A1 * | 7/2005 | Huisma et al. | 119/842 |
| 2006/0206011 A1 * | 9/2006 | Higgins et al. | 600/300 |
| 2007/0034206 A1 | 2/2007 | Urmanov et al. | |
| 2007/0050777 A1 * | 3/2007 | Hutchinson et al. | 718/104 |
| 2007/0265811 A1 * | 11/2007 | Chalasani et al. | 703/2 |

* cited by examiner

*Primary Examiner* — Brian P Whipple
*Assistant Examiner* — Herman Belcher
(74) *Attorney, Agent, or Firm* — Polsinelli Shughart PC (57) ABSTRACT

A method for performing server monitoring via condition tracking and state identification of server components. In one embodiment, the method includes continuously monitoring a server, the server having a plurality of components, determining whether a component of the plurality of components has entered a maintenance state, and triggering a maintenance action for the component if it has entered the maintenance state.

15 Claims, 9 Drawing Sheets

System warnings (the stem lines) and system boots (the dashed lines) after crash due to voltage instabilities

METHOD AND SYSTEM FOR IDENTIFICATION OF DECISIVE ACTION STATE OF SERVER COMPONENTS VIA TELEMETRIC CONDITION TRACKING

FIELD

An embodiment of the invention relates to enhancing reliability within computer systems, and more specifically, to monitoring of servers using a mechanism for telemetric condition tracking and decisive action state identification of server components.

BACKGROUND

With the increase in electronic commerce, enterprise computing systems are becoming more complex and increased reliance on such computer systems is expected by businesses and organizations. Thus, any failure of a computer system can be very costly in terms of time and money and can undermine consumer confidence in a business to which the failed computer system belongs. However, the conventional maintenance approaches exploit idle or low load periods for replacement of identified faulty components and provide for major limitations in their performance.

For example, the conventional ways to schedule a system maintenance requires the knowledge of the exact form of the degraded failure rate of a given computer system. Such information is not only nearly impossible to obtain in practice, but also can be changing after each replacement of various system components. Furthermore, the conventional approaches for monitoring physical variables such as temperature, voltage, current, revolutions per minute (RPM), etc., in computer servers is performed via threshold limit rules that generate an alarm condition if a variable level starts to go out of specification. A threshold crossing event triggers a maintenance action. However, such threshold limit rules suffer from high false and/or missed alarm rates that significantly diminish the value of preventive maintenance. Also, the conventional approaches rely on passive fault detection in computer systems and typically, they do not actively probe the condition of electronic components.

Figure 1:
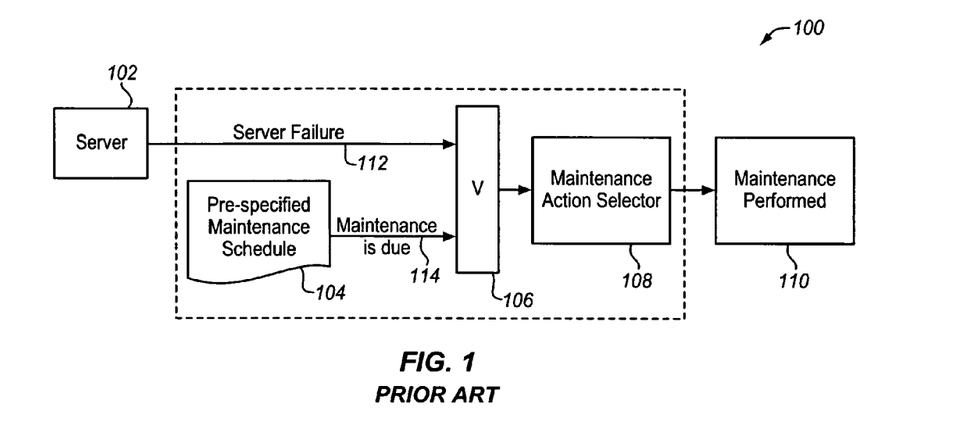
FIG. 1 illustrates a prior art scheme for providing schedule-based computer server maintenance.

FIG. 1 illustrates a prior art scheme 100 for providing schedule-based computer server maintenance. The illustrated traditional scheme 100 provides for a computer maintenance system for server 102 that follows a pre-specified maintenance schedule 102 (e.g., change a server cooling air filter every 3 months). During server exploitation, when a server failure 112 occurs for server 102 or a pre-specified maintenance action is due 114 according to the pre-specified maintenance schedule 104, maintenance action selector module 108 receives and processes a request for maintenance. This scheme is known as the conventional schedule-based maintenance strategy. One of the prominent drawbacks of this scheme 100 is that in numerous situations even when the computer system does not require any maintenance, the maintenance that is due 114 (but not required) is performed, which adds to the cost of maintaining the computer system and leads to additional system failures that are maintenance-induced.

SUMMARY

According to one embodiment, a method for performing server monitoring using a mechanism for telemetric condition tracking and decisive action state identification of server components is disclosed. The method includes continuously monitoring a server, the server having a plurality of components, determining whether a component of the plurality of components has entered a maintenance state, and triggering a maintenance action for the component if it has entered the maintenance state.

Other embodiments are also disclosed. Further, the above attributes may be implemented using a computer program, a system, or an apparatus, or any combination thereof. These and other details of one or more embodiments of the present invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

In one embodiment, a decisive action state identification (DASI) analysis mechanism is employed for computer system components or computer field replaceable units (FRUs) that can exhibit a wide range of subtle and incipient problems. The telemetric condition data of the monitored components is continuously tracked and converted into a component state that reflects current component health. A decisive action state (DAS) of the monitored components is then determined from the telemetric condition tracking data to (1) achieve the maximum component availability, while (2) minimizing risk of making incorrect decisions due to the empirical nature of the telemetric data. Maintenance actions, which are undertaken once a component enters into a decisive action state, help assure maximum availability of the computing system.

The DASI analysis methodology employed here is performed in a time domain by first identifying whether a component enters a decisive action state via the telemetric condition tracking and then triggering a maintenance action when a component is in the decisive action state. By employing an embodiment of the DASI analysis mechanism, any computer system maintenance-related false alarms that are endemic to conventional preventive maintenance schemes are avoided.

In one embodiment, a sudden impulse change is first introduced in one or more operational parameters (e.g., load, voltage, temperature, etc.) of an FRU under surveillance, which generates a telemetric impulsional response fingerprint (TIRF) for the FRU. The TIRF is associated with the current condition or health of the FRU and provides a unique active probe machine-learning technique that leverages continuous system telemetry to provide dynamic and multivariate "fingerprints" for FRU that can be compared, for example, with previous TIRFs. Further, the TIRF represents a response of the FRU to a disturbance in its input or other parameters. TIRFs may be provided via a graph such that they can be observed and examined by users, such as system administrators. However, naturally, such user-based comparisons can be subjective and do not scale. Automatic and machine-based analysis of TIRFs is provided by providing a "residual" TIRF, which is obtained by subtracting a TIRF for a good condition FRU from a "real-time" TIRF computed for test FRUs.

Once a reference TIRF is generated and stored, the TIRFs for any "test" FRUs (e.g. units at a customer site, units undergoing qual testing in OPS, RQT, or ORT, etc.) are continuously subtracted from the reference TIRF to create a residual TIRF. When a computer system that is being monitored is operating normally, the values contained in the residual TIRF are very small and reflect only random process and measurement noise. Then, the set of all possible values of the residual TIRF is partitioned into a specified number of subsets termed states. The partitioning is performed based on the physics of failure of the monitored FRU or based on an empirical method of learning from historical data for this FRU or other similar FRUs.

During a training phase a decisive action state of the monitored FRU is determined using an embodiment of the DASI mechanism. A decisive-action state of an FRU includes a single subset or several subsets from the partition in which a maintenance action is performed to achieve maximum availability of the FRU and minimum risk of making incorrect maintenance decisions. The risk associated with selecting incorrect maintenance decisions is due to the empirical nature of the telemetric data that is used to determine the FRU condition. Once a decisive action state of an FRU is obtained, it is stored for usage during a monitoring phase. During such monitoring phase, the monitored FRUs are placed under continuous telemetric tracking. Once a monitored component enters the decisive action state, a corresponding maintenance action is performed to achieve maximum system availability, while minimizing the risk of making incorrect or faulty maintenance actions.

Figure 2:
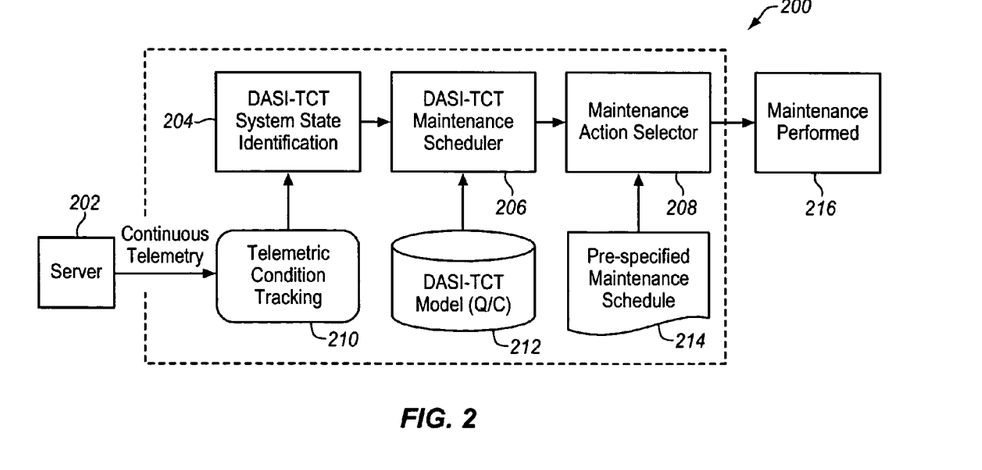
FIG. 2 illustrates an embodiment of a decisive action state identification mechanism for performing computer system maintenance via telemetric condition tracking.

FIG. 2 illustrates an embodiment of a decisive action state identification mechanism 200 for performing computer system maintenance via telemetric condition tracking. Server 202 of a computer system is monitored by telemetric condition tracking (TCT) module 210 via continuous system telemetry (CST) and its condition is extracted in a TCT module. Further, the TCT module uses TIRF to obtain the condition of server 202 via dynamic telemetry signals. DASI-TCT system state identification module 204 is employed to determine the current state of server 202 based on the server condition obtained from TCT Module 210. DASI-TCT maintenance scheduler 206 uses the current state of server 202 and DASI-TCT model 212 represented by a state transition probabilities matrix (Q) and cost function (C) to determine whether a maintenance should be scheduled for the current server state to meet the specified goals (e.g., cost goal).

In one embodiment, TCT module 210 receives continuous server telemetry signals (e.g., voltages, currents, temperatures, fan speeds, etc.) from various server components of server 202 and employs a TIRF procedure to convert dynamic telemetry signals into the server condition represented by a scalar real parameter (e.g., server condition parameter). System state identification module 204 receives server condition from TCT module 210 and determines the server state based on the partitioning of server condition parameter values. Maintenance scheduler 206 receives the server state and uses DASI-TCT model 212 to determine the need for an appropriate maintenance action. If server 202 is in a state that requires a maintenance action (e.g., server 202 is in a state corresponding to one of the (1,0,0, ... , 0) rows in the state transition probability matrix Q), maintenance scheduler 206 generates a request for a maintenance event that is received and processed by the maintenance action selector 208. Maintenance action selector 208 receives the maintenance event request from the maintenance scheduler 206 and process the request and then selects an appropriate maintenance action from maintenance action list 214 to perform the maintenance 216 as requested.

Figure 3:
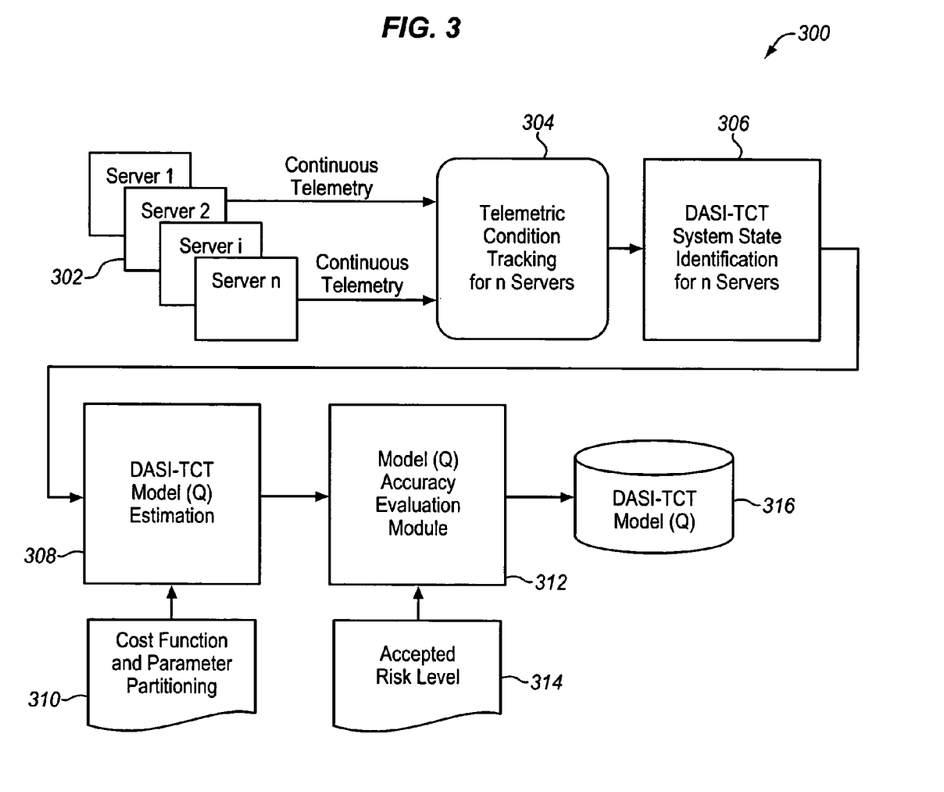
FIG. 3 illustrates an embodiment of a decisive action state identification mechanism for performing computer system maintenance and building and employing of a telemetric condition tracking model.

FIG. 3 illustrates an embodiment of a decisive action state identification mechanism 300 for performing computer system maintenance and building and employing of a telemetric condition tracking model 316. In one embodiment, DASI-TCT model 316 is built (e.g., estimated) from the historical or test data before an embodiment of DASI mechanism 300 is used for server maintenance in an online mode. DASI-TCT Model 316 comprises a server state transition probabilities matrix, Q, and a cost function, C, prescribing the cost associated with performing maintenance at different server states. The cost function may be specified by the user before the estimation process of Q. Further, an admissible or accepted level of risk 314 associated with the uncertainty of estimating matrix Q may be pre-specified by the user.

The risk is in setting a maintenance rule incorrectly due to inaccurate estimation of some entries in matrix Q. Having employed a maintenance rule, the structure of matrix Q is understood. For example, if Q's last row represents (1,0,0, ... , 0), then when a server of servers 302 enters the last state, a maintenance action is performed that brings the server to the original, non-degraded state. This is referred to as a maintenance rule. If, for example, Q's last two rows are (1,0,0, ... , 0), then a maintenance action brings the server to the original state from the server's last and one before last state. This is regarded as another maintenance rule. On the basis of admissible risk, the system determines for how long to observe the servers n 302 to achieve the appropriate accuracy of estimated matrix Q 312 as evaluated by model (Q) accuracy evaluation module 312 such that the associated risk level stays below the admissible risk level as specified by acceptable risk level 314.

Once the accuracy of the estimated Q is evaluated by accuracy evaluation module 312 and the accuracy conforms to the admissible risk of acceptable risk level 314, the model building process terminates and the estimated Q is saved as DASI-TCT model 316. Server 1-n 302 represent individual servers or server components put on test or selected from available operating servers for building DASI-TCT model 316. Continuous system telemetry feeds dynamic telemetry signals from servers 302 to TCT module 304 associated with servers 302. TCT module 304 receives continuous server telemetry signals (e.g., voltages, currents, temperatures, fan speeds, etc) from servers 302 and employs a TIRF procedure to convert dynamic telemetry signals into a server condition represented by a scalar real parameter for each server of servers 302. DASI-TCT system state identification module 306 receives server condition from TCT module 304 for servers 302 and determines each server state based on the partitioning of server condition parameter values. The partitioning of the server condition parameter values may be pre-specified by the user. The user may specify alternative partitioning of the parameter values and choose the ones that minimize the cost function.

DASI-TCT model estimation module 308 receives data from system state identification module 306 and keeps track of transitions between the states for servers 302 and uses the frequencies of transitions between the states to estimate the entries of the Q matrix. Model accuracy evaluation module 312 computes the observation time required to meet the admissible risk specification. Given the accepted risk level 314 of violating a maintenance rule, accuracy evaluation module 312 uses statistical simulations to determine the admissible bounds on the entries of the matrix Q and computes the necessary observation time to meet the admissible risk as specified by accepted risk level 314.

Figure 4:
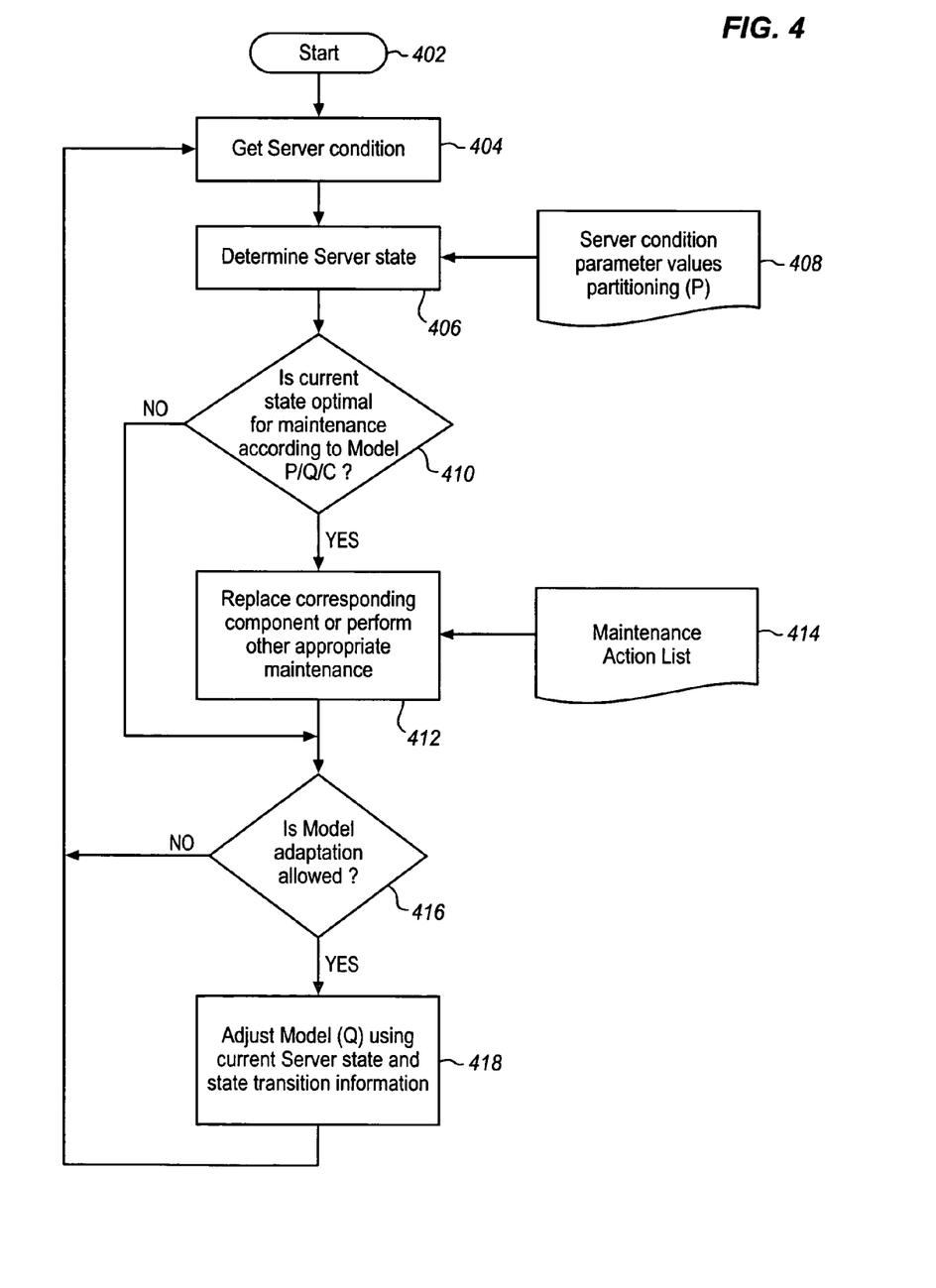
FIG. 4 illustrates an embodiment of a process for computer system maintenance using a decisive action state identification/telemetric condition tracking-based mechanism.

FIG. 4 illustrates an embodiment of a process for computer system maintenance using a decisive action state identification/telemetric condition tracking-based mechanism. In one embodiment, a DASI-TCT model (e.g., P/Q/C model) for predictive server maintenance that uses state transition probabilities matrix (Q), partitioning of server condition parameter values (P), and cost (or objective) function (C). At the start 402 of the process, server condition of a server is obtained at processing block 404. At processing block 406, server state of the server is determined by partitioning server condition parameter values at block 408. At decision block 410, whether the current state is optimal for maintenance according to the DASI-TCE (P/Q/C) model is determined. If the current state is optimal, the corresponding server component that is being monitored is either replaced or appropriate maintenance is performed on it at processing block 412. The appropriate maintenance is performed according to a maintenance action list at block 414.

If the current state is not optimal, the process continues with a determination of whether model adaptation allowed at decision block 416. If model adaptation is allowed, model (Q) is adjusted using the current server state and state transition information at processing block 418. If model adaptation is not allowed or after model (Q) is adjusted, the process continues with processing block 404.

Figure 5:
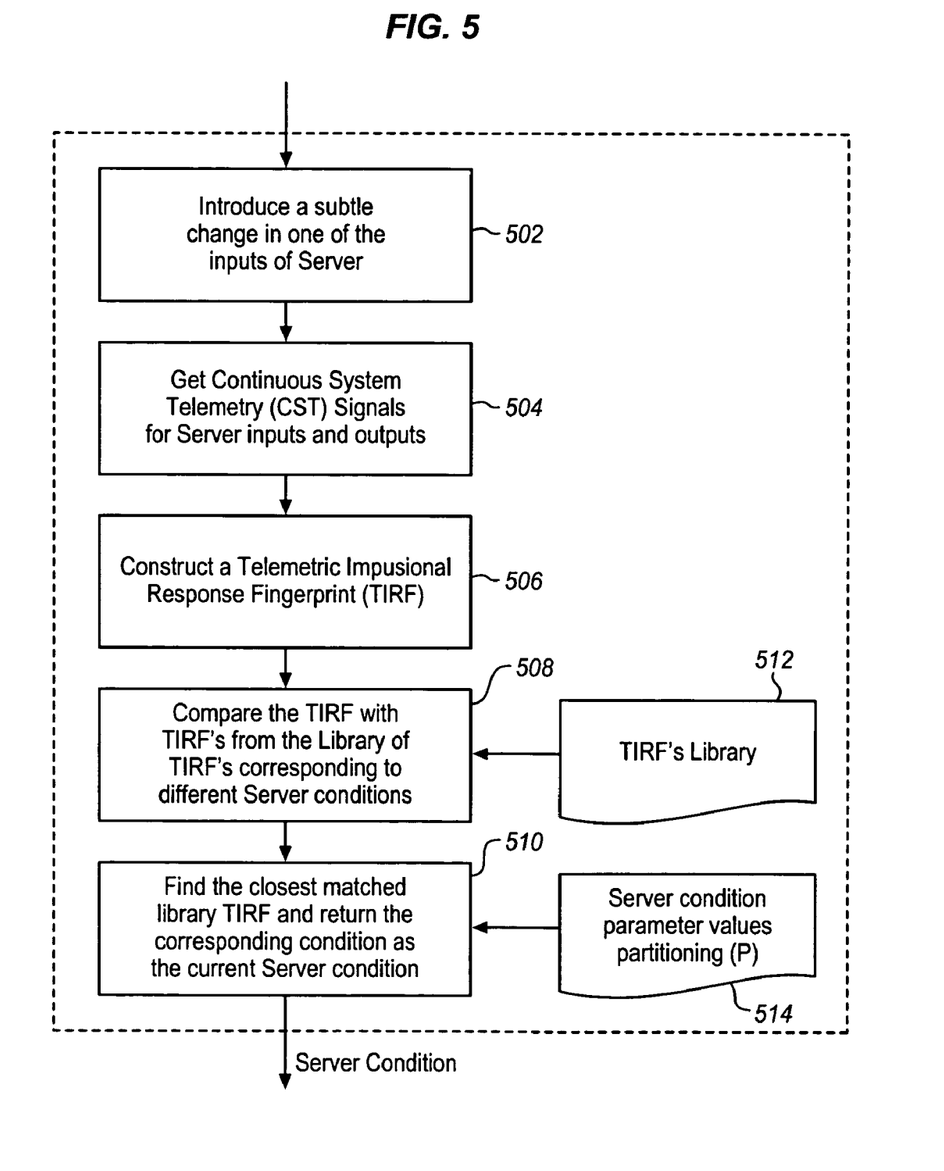
FIG. 5 illustrates an embodiment of a process for computer system maintenance by obtaining server conditions of servers from continuous system telemetry signals using a variant employing telemetric impulsional response fingerprints.

FIG. 5 illustrates an embodiment of a process for computer system maintenance by obtaining server conditions of servers from continuous system telemetry signals using a variant employing telemetric impulsional response fingerprints. In one embodiment, at processing block 502, a subtle change is introduced in one of the inputs of a server. At processing block 504, CST signals are obtained for server inputs and outputs. A TIRF is constructed at processing block 506. The TIRF constructed is then compared with the TIRF obtained from a library of TIRF, at block 512, corresponding to different server conditions at processing block 508. Server condition parameter values are then partitioned at block 514 and a closest matched library TIRF is found and the corresponding condition as the current server condition is returned at processing block 510.

Figure 6:
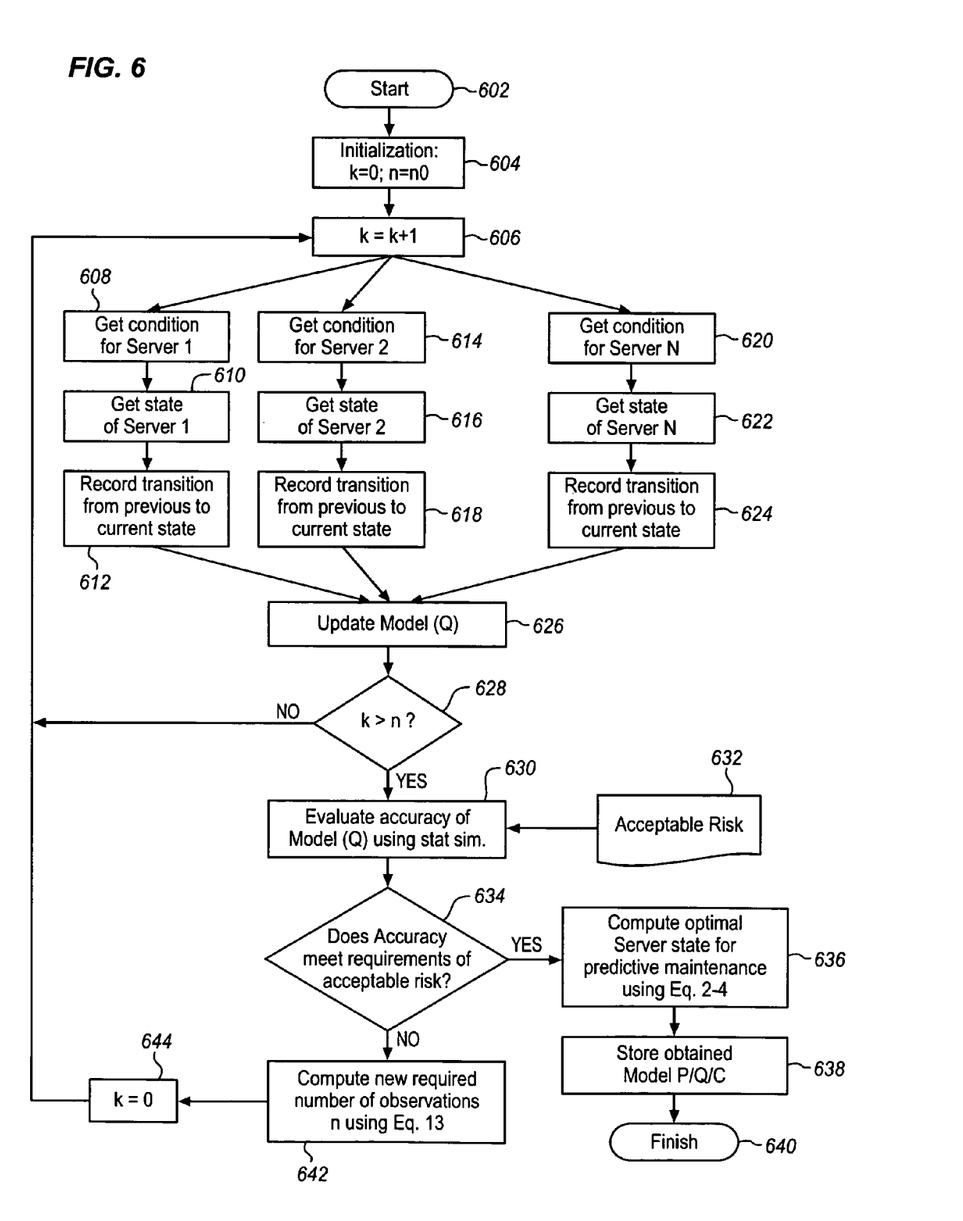
FIG. 6 illustrates an embodiment of a process for building an initial model for decisive action state information/telemetric condition tracking-based predictive computer system maintenance by observing multiple servers.

FIG. 6 illustrates an embodiment of a process for building an initial model for decisive action state information/telemetric condition tracking-based predictive computer system maintenance by observing multiple servers. In one embodiment, the obtained DASI/TCT model (e.g., P/Q/C model) is used to provide an optimal state of a monitored server on which maintenance is to be preformed. Its usage is demonstrated here in FIG. 6. At start 602, initialization (e.g., k=0, n=0) is performed at processing block 604. The value of k is incremented using a formula (e.g., k=k+1) at block 606. At processing block 608, server condition for server 1 is obtained. At processing block 610, server state of server 1 is obtained. A transition from previous server state to current server state is recorded at processing block 612. Model (Q) is updated at processing block 626. Similarly, server conditions for servers 2 and 3 are obtained at processing blocks 614, 620, and server states are obtained for servers 2 and 3 at processing blocks 616, 622. Transitions from previous server state and current server state are recorded for servers 2 and 3 at processing blocks 618, 624. Model (Q) is updated at processing block 626.

At decision block 628, a determination is made as to whether the value of k is greater than the value of n. If the value of k is less than the value of n, the process continues with processing block 606 by further incrementing the value of k. If the value is greater, the acceptable risk level is obtained 632 and the accuracy of model (Q) is evaluated using statistic simulation at processing block 630. At decision block 634, whether the evaluated accuracy meets the requirements of an acceptable risk level is determined. If the accuracy meets the requirements, an optimal server state for predictive maintenance is computed at processing block 636. The obtained model P/Q/C is stored at processing block 638 and the process ends at termination block 640. Referring back to decision block 634, if the accuracy does not meet the requirements of the acceptable risk, a new required number of observations is computed at processing block 642, setting the value of k at 0 at processing block 644 and the process continues with processing block 606.

Figure 7A:
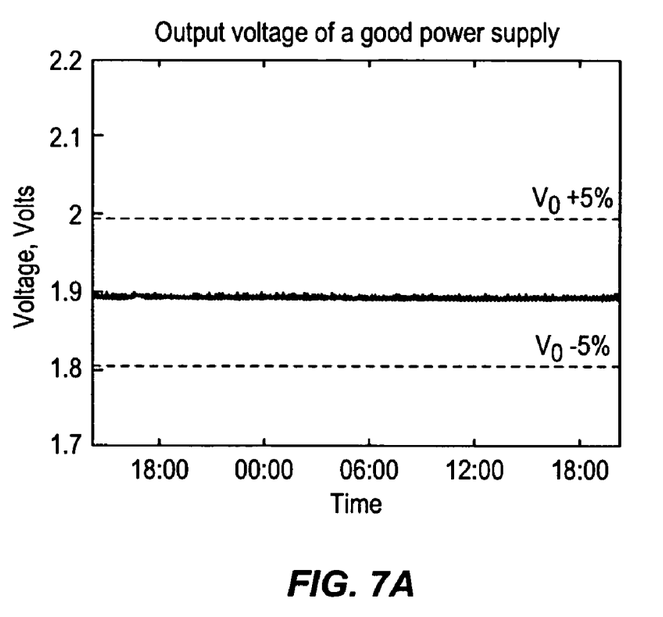
FIGS. 7A-7F illustrate an embodiment of an exemplary use of a decisive action state information/telemetric condition tracking-based mechanism for computer system maintenance of servers.

FIGS. 7A-7F illustrate an embodiment of an exemplary use of a decisive action state information/telemetric condition tracking-based mechanism for computer system maintenance of servers. In one embodiment, using the DASI/TCT preventive monitoring mechanism maximizes availability of electronic components of high-end enterprise computing servers of enterprise computer systems. A variety of failure modes for components in high-end servers may show up first as an anomaly in TIRF. FIGS. 7A-7F illustrate a maximization of the availability of DC/DC converters used on system boards of high end servers. For example, a health converter is illustrated in FIG. 7A which reflects TIRF of a healthy converter along with the thresholds (as indicated by the dotted lines) for admissible variation of voltage of a normally functioning (healthy) power supply. The TIRF in this example is the output voltage response of the DC/DC converter to a sudden change in the operating temperature. The voltage is very close to the set point, which in this case is 1.9 volts, and has little variation with respect to the processor load and temperature. Here, the voltage is very well regulated, as it ought to be for a healthy DC/DC converter.

Figure 7B:
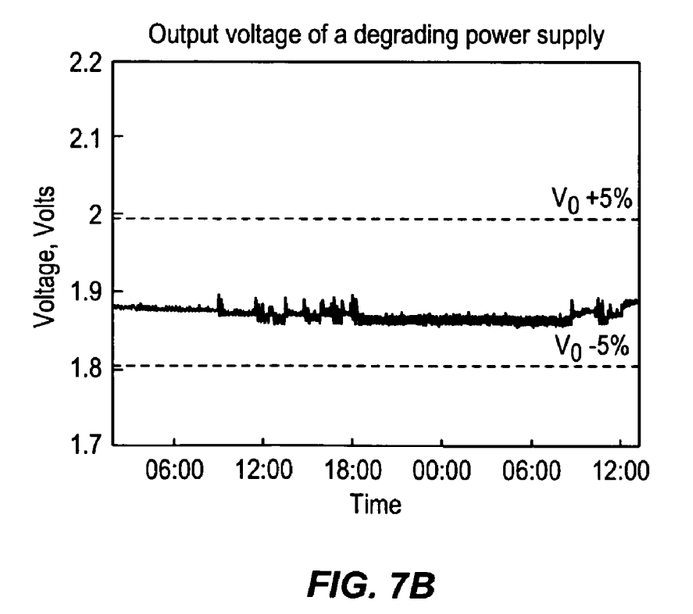
Figure 7C:
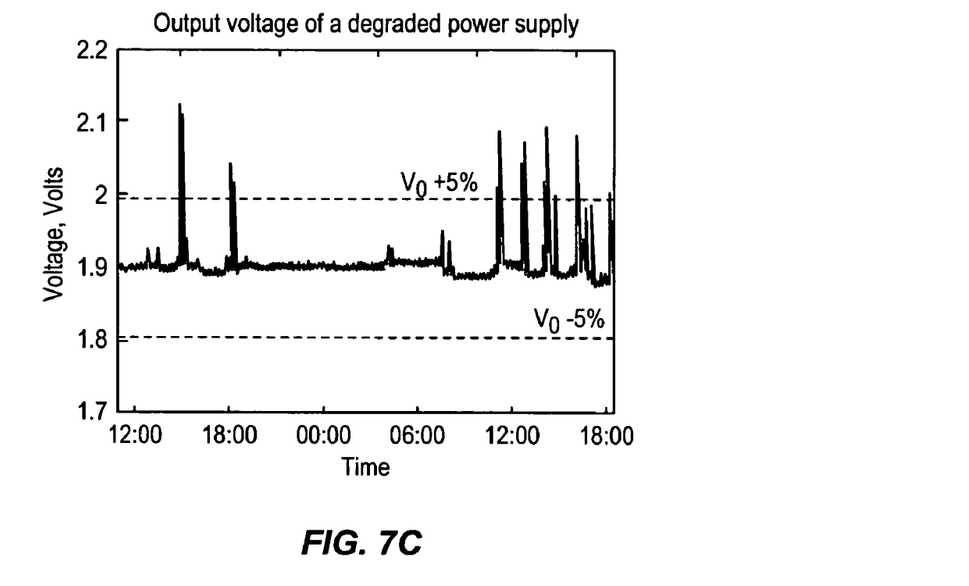

FIG. 7B illustrates the TIRF of a degrading converter. As illustrated, the voltage is not well regulated and provides a significant variation with respect to the processor load and temperature. Although the voltage level is shown to stay within the admissible bounds or thresholds (e.g., +/−5% volts of the nominal value), it is not long before the degradation is to cause significant regulation problems, as illustrated in FIG. 7C. Such large voltage instabilities (as shown by the spikes that are large enough to cross over the thresholds) can lead to errors on the system board.

Figure 7D:
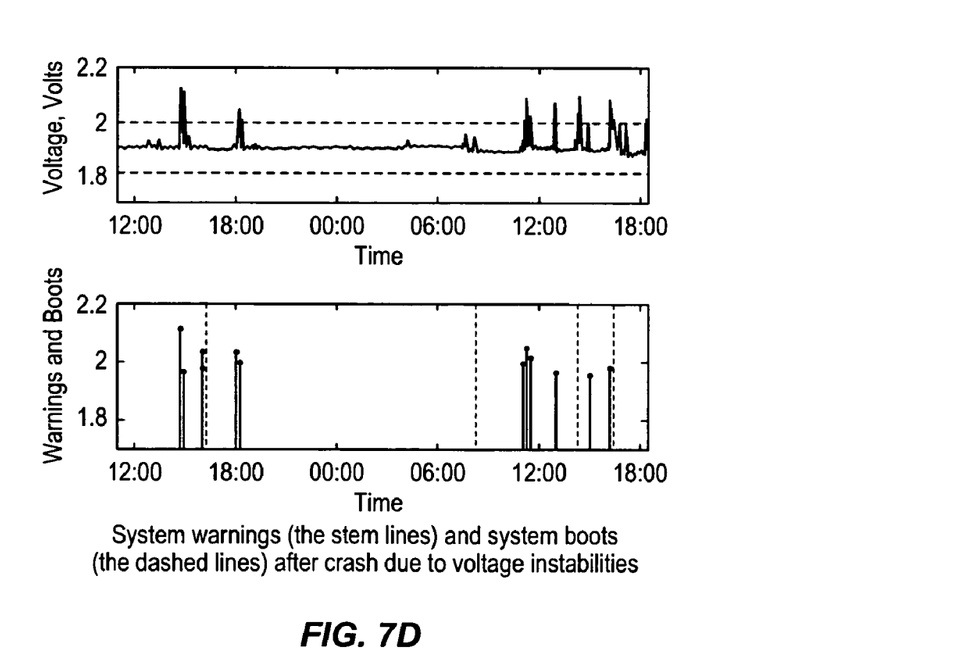
Figure 7E:
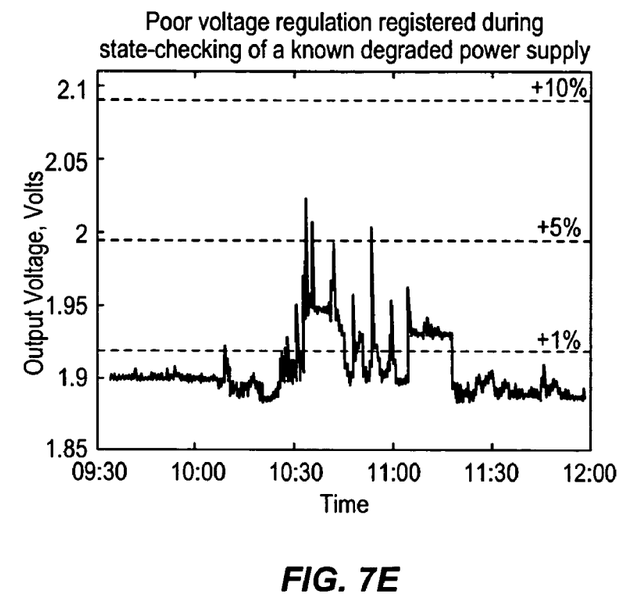

A late detection of such degradation or unnoticed instabilities can cause system errors in processors and further cause a domain stop, which is a reaction of the system to an uncorrectable error in central processing unit (CPU), memory, etc. FIG. 7D illustrates system warnings and reboots when a severely degraded power supply is used. The vertical dotted lines on the bottom subplot of FIG. 7D indicate the times when system was rebooted after a crash due to a CPU error, e-cache error, etc. Unless the voltage data are continuously collected using CSTH and plotted with the system reboot events, it is not obvious that the various CPU and e-cache related errors were actually caused by the degraded power supply.

In addition to the crashes and resulting downtime, conventionally, when such a system board is sent to a repair shop with a processor related error, it is most probably pronounced no-trouble-found (NTF) after hours of standard testing that does not include the characterization of voltage signals of all power supplies on the system board. Further, conventionally, even if a test procedure does include characterization of power supplies, other factors, such as the stochastic nature of the degradation, the environmental conditions, the test duration, may prevent the degradation phenomenon from showing up.

Figure 7F:
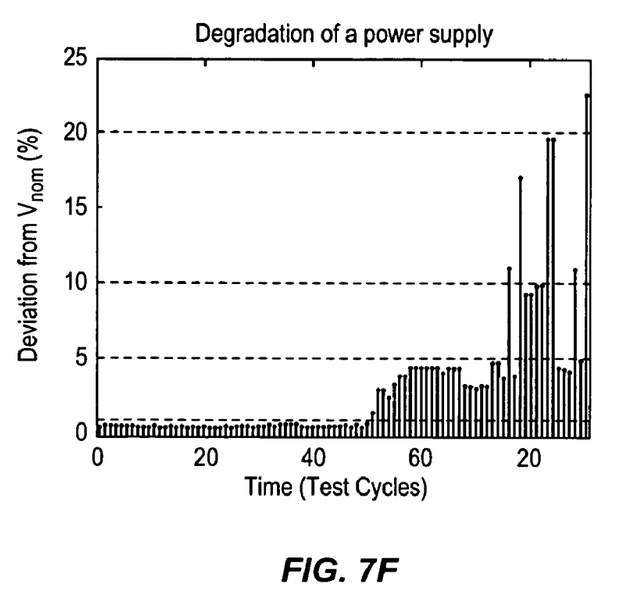

The possible values of the TIRF are partitioned into five states. The first state represents a state without degradation, while the fifth state represents the failed state. These states are demonstrated in FIGS. 7E-7F. For example, in FIG. 7F, the horizontal dotted lines indicate the boundaries of the five different states characterizing the condition of the power supplies, ranging from no degradation to failure. In one embodiment, such observation provides the following matrix of transition probabilities (where, the probabilities<0.01 are shown as 0.00).

$$Q_{PS} = \begin{bmatrix} 0.98 & 0.01 & 0.01 & 0.00 & 0.00 \\ 0.04 & 0.82 & 0.07 & 0.04 & 0.03 \\ 0.01 & 0.02 & 0.55 & 0.28 & 0.14 \\ 0.00 & 0.00 & 0.01 & 0.41 & 0.58 \\ 1 & 0 & 0 & 0 & 0 \end{bmatrix}$$

For example, the time required to replace a power supply is assumed to be 0.5 hours. The time to recover the system after a crash due to a power supply failure is assumed to be 1 hour that also factors in the necessity to get a replacement part whereas in the first case the replacement part was readily available due to the planned nature of preventive maintenance. The following solutions, summarized in Table 1, are obtained for different modifications of the transition probabilities matrix. The minimum value of the objective function C is achieved for the decisive action state three. The system's availability is thus maximized for this decisive action state.

TABLE 1

Transition probabilities and cost function.

| Transitions Pr. Matrix | | | | | State Pr. | Cost |
|---|---|---|---|---|---|---|
| 0.98 | 0.01 | 0.01 | 0.00 | 0.00 | $\pi_1 = 0.89$ | $C(5) = 0.93$ |
| 0.04 | 0.82 | 0.07 | 0.04 | 0.03 | $\pi_2 = 0.05$ | |
| 0.01 | 0.02 | 0.55 | 0.28 | 0.14 | $\pi_3 = 0.02$ | |
| 0.00 | 0.00 | 0.01 | 0.41 | 0.58 | $\pi_4 = 0.01$ | |
| 1 | 0 | 0 | 0 | 0 | $\pi_5 = 0.01$ | |
| 0.98 | 0.01 | 0.01 | 0.00 | 0.00 | $\pi_1 = 0.91$ | $C(4) = 0.63$ |
| 0.04 | 0.82 | 0.07 | 0.04 | 0.03 | $\pi_2 = 0.05$ | |
| 0.01 | 0.02 | 0.55 | 0.28 | 0.14 | $\pi_3 = 0.02$ | |
| 1 | 0 | 0 | 0 | 0 | $\pi_4 = 0.01$ | |
| 1 | 0 | 0 | 0 | 0 | $\pi_5 = 0.00$ | |
| 0.98 | 0.01 | 0.01 | 0.00 | 0.00 | $\pi_1 = 0.93$ | $C(3) = 0.57$ |
| 0.04 | 0.82 | 0.07 | 0.04 | 0.03 | $\pi_2 = 0.05$ | |
| 1 | 0 | 0 | 0 | 0 | $\pi_3 = 0.01$ | |
| 1 | 0 | 0 | 0 | 0 | $\pi_4 = 0.00$ | |
| 1 | 0 | 0 | 0 | 0 | $\pi_5 = 0.00$ | |
| 0.98 | 0.01 | 0.01 | 0.00 | 0.00 | $\pi_1 = 0.98$ | $C(2) = 0.62$ |
| 1 | 0 | 0 | 0 | 0 | $\pi_2 = 0.01$ | |
| 1 | 0 | 0 | 0 | 0 | $\pi_3 = 0.00$ | |
| 1 | 0 | 0 | 0 | 0 | $\pi_4 = 0.00$ | |
| 1 | 0 | 0 | 0 | 0 | $\pi_5 = 0.00$ | |

The analysis of the matrix of transition probabilities, when entries of this matrix are slightly varied using the statistical simulation, shows that the a critical element of this matrix is the probability $q_{35}=0.14$ and $q_{45}=0.58$. The statistical simulation also shows that 30% deviation of these probabilities does not change the obtained decisive action state. So acceptable intervals for theses probabilities are (0.09-0.18) and (0.41-0.75) respectively. Taking into consideration that $1_{g^{0.95}}=1.96$, 27 observations are needed to be computed to keep the probability $q_{45}$ in the corresponding interval with 90% confidence and 262 observations to keep $q_{35}$ in interval (0.09-0.18).

Figure 8:
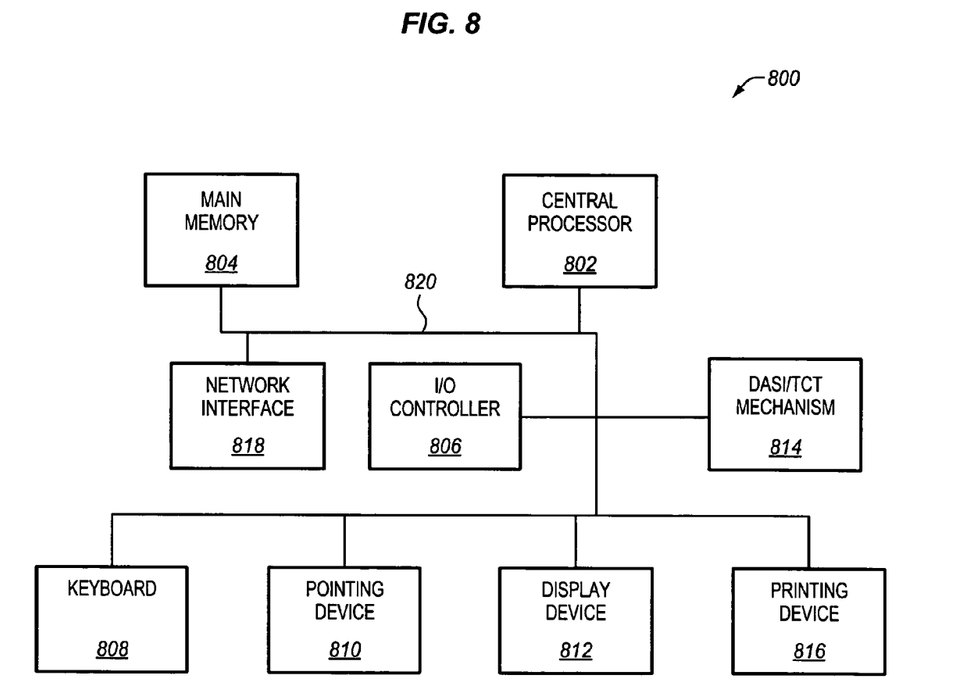
FIG. 8 illustrates an embodiment of a computer system.

FIG. 8 illustrates an embodiment of a computer system 800. Computer system 800 comprises a central processor 802, a main memory 804, an input/output (I/O) controller 806, a keyboard 808, a pointing device 810 (e.g., mouse, track ball, pen device, or the like), a display device 812, and a network interface 818. Additional input/output devices, such as a printing device 816, may be included in the system 800 as desired. As illustrated, the various components of the computer system 800 communicate through a system bus 820 or similar architecture.

In a further embodiment, computer system 800 may be a distributed computing system. In other words, one or more of the various components of the computer system 800 may be located in a physically separate location than the other components of the computer system 800. Such components may be accessed and connected via a network to the other components.

In one embodiment, computer system 800 includes a Sun® Microsystems computer utilizing a Scalable Processor Architecture (SPARC™) microprocessor available from several vendors (including Sun® Microsystems, Inc., of Santa Clara, Calif.). Those with ordinary skill in the art understand, however, that any number and type of computer systems may be utilized to provide one or more embodiments of the present invention, including those made by Hewlett Packard® of Palo Alto, Calif., and International Business Machines (IBM®)—compatible personal computers utilizing Intel microprocessors, which are available from several vendors (including IBM® of Armonk, N.Y.).

Also, instead of a single processor 802, two or more processors (whether on a single chip or on separate chips) can be utilized to provide speedup in operations. It is further envisioned that the processor 802 may be a complex instruction set computer (CISC) microprocessor, a reduced instruction set computing (RISC) microprocessor, a very long instruction word (VLIW) microprocessor, a processor implementing a combination of instruction sets, and the like.

The network interface 818 provides the communication capability with a host or other computer systems (as described in previous paragraph) on a same local network, on a different network connected via modems and the like to the present network, or to other computers across the Internet. In various embodiments, the network interface 818 can be implemented utilizing technologies including, but not limited to, Ethernet, Fast Ethernet, Gigabit Ethernet (such as that covered by the Institute of Electrical and Electronics Engineers (IEEE) 701.1 standard), wide-area network (WAN), leased line (such as T1, T3, optical carrier 3 (OC3), and the like), analog modem, digital subscriber line (DSL) and its varieties such as high bit-rate DSL (HDSL), integrated services digital network DSL (IDSL), and the like, cellular, wireless networks (such as those implemented by utilizing the wireless application protocol (WAP)), time division multiplexing (TDM), universal serial bus (USB) and its varieties such as USB II, asynchronous transfer mode (ATM), satellite, cable modem, FireWire, and the like.

Moreover, the computer system 800 may utilize operating systems, such as Solaris™, Windows® (and its varieties such as CE®, NT®, 2000®, XP®, ME®, and the like), HP-UX®, IBM-AIX®, PALM®, UNIX®, Berkeley software distribution (BSD) UNIX®, Linux, Apple UNIX (A/UX®), Macintosh® operating system (Mac OS®) (including Mac OS X®), and the like. Also, it is envisioned that in certain embodiments of the present invention, the computer system 800 is a general purpose computer capable of running any number of applications such as those available from companies including Oracle®, Siebel®, Unisys®, Microsoft®, and the like.

Computer system 800 may also include decisive action state identification/telemetric condition tracking mechanism 814 for server monitoring to provide high reliability computer systems. DASI/TCT mechanism 814 may be coupled to I/O controller 806 via a Universal Serial Bus (USB). For example, DASI/TCT mechanism 814 may be coupled to an I/O controller 806 via one or more peripheral interfaces.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Furthermore, embodiments of the present invention may be provided as computer program products, which may include an article of manufacture including a machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
continuously monitoring a plurality of hardware components of a server using a computer system;
receiving telemetric information at the computer system for at least one of the plurality of hardware components;
determining a server state by comparing the received telemetric information to a library of pre-determined server states stored in a main memory of the computer system, each pre-determined server state corresponding to different server conditions;
determining whether the server state indicates that maintenance of the server is optimal by comparing the server state to an estimated optimal server maintenance model, the optimal server maintenance model comprising a state transition probabilities matrix and an estimated cost associated with performing maintenance for each of the server states, wherein the estimated cost corresponds to at least a time required to perform the maintenance; and
triggering a maintenance action for the at least one hardware component if the server state indicates that maintenance of the server is optimal.

2. The method of claim 1, further comprising obtaining an initial condition of the server by reading a current state of the server.

3. The method of claim 1, wherein the maintenance action is triggered when there is a change in the at least one hardware component behavior.

4. The method of claim 3, wherein the change in the at least one hardware component behavior comprises the at least one hardware component behavior crossing a predetermined threshold level.

5. The method of claim 1, further comprising:
generating a request for maintenance;
processing the request for maintenance; and
selecting the maintenance action from a plurality of maintenance actions to be performed on the at least one hardware component.

6. A system comprising:
at least one processor; and
a computer-readable storage medium, the computer readable storage medium storing a computer-executable code that, when executed by the at least one processor, causes the at least one processor to perform the operations of:
continuously monitoring a plurality of hardware components of a server;
receiving telemetric information for at least one of the plurality of hardware components;
determining a server state by comparing the received telemetric information to a library of pre-determined server states, each pre-determined server state corresponding to different server conditions;
determining whether the server state indicates that maintenance of the server is optimal by comparing the server state to an estimated optimal server maintenance model, the optimal server maintenance model comprising a state transition probabilities matrix and an estimated cost associated with performing maintenance for each of the server states, wherein the estimated cost corresponds to at least a time required to perform the maintenance; and
triggering a maintenance action for the at least one hardware component if the server state indicates that maintenance of the server is optimal.

7. The system of claim 6, wherein the computer-executable code further causes the at least one processor to perform the operation of obtaining an initial condition of the server by reading a current state of the server.

8. The system of claim 6, wherein the maintenance action is triggered when there is a change in the at least one hardware component behavior.

9. The system of claim 8, wherein the change in the at least one hardware component behavior comprises the at least one hardware component behavior crossing a predetermined threshold level.

10. The system of claim 6, wherein the computer-executable code further causes the at least one processor to perform the operations of:
generating a request for maintenance; and
processing the request for maintenance; and
selecting the maintenance action from a plurality of maintenance actions to be performed on the at least one hardware component.

11. An article of manufacture comprising:
a non-transitory machine-readable medium having instructions which when executed, cause a machine to:
continuously monitor a plurality of hardware components of a server;
receive telemetric information for at least one of the plurality of hardware components;
determine a server state by comparing the received telemetric information to a library of pre-determined server states, each pre-determined server state corresponding to different server conditions;
determine whether the server state indicates that maintenance of the server is optimal by comparing the server state to an estimated optimal server maintenance model, the optimal server maintenance model comprising a state transition probabilities matrix and an estimated cost associated with performing maintenance for each of the server states, wherein the estimated cost corresponds to at least a time required to perform the maintenance; and
trigger a maintenance action for the at least one hardware component if the server state indicates that maintenance of the server is optimal.

12. The article of manufacture of claim 11, wherein the instructions when further executed, cause the machine to obtain an initial condition of the server by reading a current state of the server.

13. The article of manufacture of claim 11, wherein the maintenance action is triggered when there is a change in the at least one hardware component behavior.

14. The article of manufacture of claim 13, wherein the change in the at least one hardware component behavior comprises the at least one hardware component behavior crossing a predetermined threshold level.

15. The article of manufacture of claim 11, wherein the instructions when further executed, cause the machine to:
generate a request for maintenance;
process the request for maintenance; and
select the maintenance action from a plurality of maintenance actions to be performed on the at least one hardware component.

* * * * *